(12) United States Patent
Sinha et al.

(10) Patent No.: US 11,360,570 B2
(45) Date of Patent: *Jun. 14, 2022

(54) SYSTEM FOR HAND POSE DETECTION

(71) Applicant: Purdue Research Foundation, West Lafayette, IN (US)

(72) Inventors: Ayan Sinha, West Lafayette, IN (US); Chiho Choi, West Lafayette, IN (US); Joon Hee Choi, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,160

(22) Filed: Nov. 30, 2020

(65) Prior Publication Data

US 2021/0081055 A1 Mar. 18, 2021

Related U.S. Application Data

(60) Continuation of application No. 16/707,936, filed on Dec. 9, 2019, now Pat. No. 10,852,840, which is a (Continued)

(51) Int. Cl.
*G06F 3/01* (2006.01)
*H04N 13/271* (2018.01)
(Continued)

(52) U.S. Cl.
CPC ............ *G06F 3/017* (2013.01); *G06N 20/00* (2019.01); *G06V 10/454* (2022.01); *G06V 20/653* (2022.01); *G06V 30/194* (2022.01); *G06V 40/11* (2022.01); *G06V 40/113* (2022.01); *H04N 13/271* (2018.05)

(58) Field of Classification Search
CPC ............ G06K 9/00382; G06K 9/00389; G06F 3/017; G06N 20/00; G06V 10/454; G06V 20/653; G06V 30/194; G06V 40/11; G06V 40/113
See application file for complete search history.

(56) References Cited

U.S. PATENT DOCUMENTS

2013/0249786 A1* 9/2013 Wang ................. G06K 9/00389
345/156
2015/0278589 A1* 10/2015 Mazurenko ............ G06V 20/64
382/103

* cited by examiner

*Primary Examiner* — Laurence J Lee
(74) *Attorney, Agent, or Firm* — Maginot, Moore & Beck LLP

(57) ABSTRACT

A method for hand pose identification in an automated system includes providing depth map data of a hand of a user to a first neural network trained to classify features corresponding to a joint angle of a wrist in the hand to generate a first plurality of activation features and performing a first search in a predetermined plurality of activation features stored in a database in the memory to identify a first plurality of hand pose parameters for the wrist associated with predetermined activation features in the database that are nearest neighbors to the first plurality of activation features. The method further includes generating a hand pose model corresponding to the hand of the user based on the first plurality of hand pose parameters and performing an operation in the automated system in response to input from the user based on the hand pose model.

12 Claims, 7 Drawing Sheets

Related U.S. Application Data continuation of application No. 16/436,588, filed on Jun. 10, 2019, now Pat. No. 10,503,270, which is a division of application No. 15/380,002, filed on Dec. 15, 2016, now Pat. No. 10,318,008.

(60) Provisional application No. 62/267,634, filed on Dec. 15, 2015.

(51) Int. Cl.
*G06N 20/00* (2019.01)
*G06V 10/44* (2022.01)
*G06V 20/64* (2022.01)
*G06V 30/194* (2022.01)
*G06V 40/10* (2022.01)

SYSTEM FOR HAND POSE DETECTION

CLAIM OF PRIORITY

This application is a continuation of U.S. patent application Ser. No. 16/707,936, filed Dec. 9, 2019, now U.S. Pat. No. 10,852,840, which is a continuation of U.S. patent application Ser. No. 16/436,588, filed Jun. 10, 2019, now U.S. Pat. No. 10,503,270, which is a divisional application of U.S. patent application Ser. No. 15/380,002, filed on Dec. 15, 2016, now U.S. Pat. No. 10,318,008, which claims priority to U.S. Provisional Application No. 62/267,634, which is entitled "Hand Pose Detection," and was filed on Dec. 15, 2015, the entire contents of each of which are hereby incorporated herein by reference.

GOVERNMENT LICENSE RIGHTS

This invention was made with government support under Contract Nos. 1329979 and 1235232 awarded by the National Science Foundation (D.C.). The government has certain rights in the invention.

TECHNICAL FIELD

This disclosure relates generally to the field of automated gesture recognition for human machine interfaces used in automated systems and, more particularly, to methods and systems for automated detection of a pose of a human hand.

BACKGROUND

Numerous applications in the field of computer-human interaction (CHI) have begun to incorporate new modes of interaction with human users that go beyond the well-known keyboard and mouse input device interface. In particular, many virtual reality (VR) and augmented reality (AR) applications provide an interface for a human user to provide multiple forms of input including hand gestures. Hand gesture inputs include a wide range of movements of the hands including both linear and rotational hand movements along with movement of individual fingers in the hand. Earlier input systems received two-dimensional gestures using touch interfaces to track hand and finger movements in two dimensions or required the use of instrumented gloves that included complex sensors that directly measured the pose of the hand in three-dimensions. However, newer input device technologies including three-dimensional depth cameras now enable the generation of three dimensional depth map data for a hand of a user that is moving freely in a three-dimensional space without the requirement for the user to wear the glove input devices, which enables a far greater range of gesture movements that serve as inputs to a computing device.

One component in processing hand gestures in a three-dimensional space is to identify the pose of the hand as the hand moves through various positions in an input sequence. The "pose" refers to an angular orientation and shape of the hand that is affected by the movements of the muscles and the bones in the skeleton of the hand as the user moves the hand. For example, the pose is affected by the rotation of the wrist, the shape of the palm, and the positions of the fingers on the hand. Existing techniques for tracking hand poses in three-dimensions extend traditional two-dimensional (2D) image processing techniques into a three-dimensional (3D) space for hand tracking that is currently the norm. However, these techniques neglect critical affordances provided by the depth sensing camera. First, the deep learning which is the current state-of-the-art for 2D image classification is directly adapted for 3D regression and hence, loses structural information and oblivious to articulation constraints of the hand and fingers. Second, the latent information contained in the frequently used, temporally near and similar hand poses to an input depth map is lost by optimizing a single-objective function in the hand fitting module. Third, the metrics used to assess the fidelity of the hand tracking system are not focused on interactive applications as desired by the CHI community. Furthermore, the machine learning techniques are tailored to the specific error metrics, and do not focus on the bigger picture of developing a robust hand tracking method for the next generation of computer human systems (CHS). Consequently, improvements to processes and systems that perform computer-human interaction to improve the speed and accuracy of the recognition of hand poses in three-dimensional space would be beneficial.

SUMMARY

The processes and method described herein improve upon the prior art in the use of discriminative features learned from deep convolutional neural nets to recognize the hand pose invariant to camera orientation, (2) dynamically track the hand model for robust gesture intent recognition on a per frame basis by fusing deep learnt features and a collaborative filtering approach, and (3) enable completely new ways of thinking of applications that use our hand model within. Prior art hand tracking techniques are either tailored to frontal poses, initialize the model using the hand pose estimated from the previous frame, or use hand-engineered feature descriptors for recognizing the key feature points. This shows that the scope for new and improved hand model which has the following affordances: (a) invariant to camera orientations, (b) robust to self-occlusions of the hand, (c) stability against frequent changes in gestures, (d) continuous pose recovery when the hand disappears from the camera view frustum, and (e) the ability for interaction being responsive such as with shapes, to eventually produce new interactive experiences for users; remains elusive. The methods and systems described herein are effective over a wide range of camera orientations by training the network on a large database of synthetic hands rendered from different camera line of sight. Robustness against occlusion is due to discriminative training of a hierarchy of neural networks. Stability and continuous pose recovery are a consequence of the per frame analysis of depth map data, i.e., each frame is independently analyzed and the corresponding pose is calculated without any temporal information from previous frames. However, matrix completion techniques enable incorporation of temporal information when available to make the solution more robust. The systems and method described herein are applicable to numerous applications such as gaming, animation, design, education, manufacturing, construction and healthcare. Thus, the systems and methods described herein improve the operation of automated systems to recognize hand gestures that require minimalistic hardware, unconstrained physical setup and more broadly influence future deep learning constructs.

In one embodiment, a method for automated identification of a hand pose as input to an automated system has been developed. The method includes providing, with a processor in the automated system, depth map data of a hand of a user to a first neural network trained to classify features corresponding to a joint angle of a wrist in the hand to generate a first plurality of activation features, performing, with the processor and a recommendation engine stored in the memory, a first search in a predetermined plurality of activation features stored in a database in the memory to identify a first plurality of hand pose parameters for the wrist associated with predetermined activation features in the database that are nearest neighbors to the first plurality of activation features, generating, with the processor, a hand pose model corresponding to the hand of the user based on the first plurality of hand pose parameters, and performing, with the processor in the automated system, an operation in response to input from the user based at least in part on the hand pose model.

In another embodiment, a method for training a hierarchy of trained neural networks for hand pose detection has been developed. The method includes training, with a processor, a first neural network to generate a first plurality of activation features that classify an input depth map data corresponding to a hand based on a wrist angle of the hand, the training using a plurality of depth maps of a hand with predetermined wrist angles as inputs to the first neural network during the training, and storing, with the processor, the first neural network in a memory after the training for use in classifying an additional depth map corresponding to a hand based on an angle of a wrist of the hand in the additional depth map.

In another embodiment, a system for computer human interaction has been developed. The system includes a depth camera configured to generate depth map data of a hand of a user, an output device, a memory, and a processor operatively connected to the depth camera, the output device, and the memory. The processor is configured receive depth map data of a hand of a user from the depth camera, provide the depth map data to a first neural network stored in the memory, the first neural network being trained to classify features corresponding to a joint angle of a wrist in the hand to generate a first plurality of activation features, perform a first search, using a recommendation engine stored in the memory, in a predetermined plurality of activation features stored in a database stored in the memory to identify a first plurality of hand pose parameters for the wrist associated with predetermined activation features in the database that are nearest neighbors to the first plurality of activation features, generate a hand pose model corresponding to the hand of the user based on the first plurality of hand pose parameters, and generate an output with the output device in response to input from the user based at least in part on the hand pose model.

DETAILED DESCRIPTION

Figure 1:
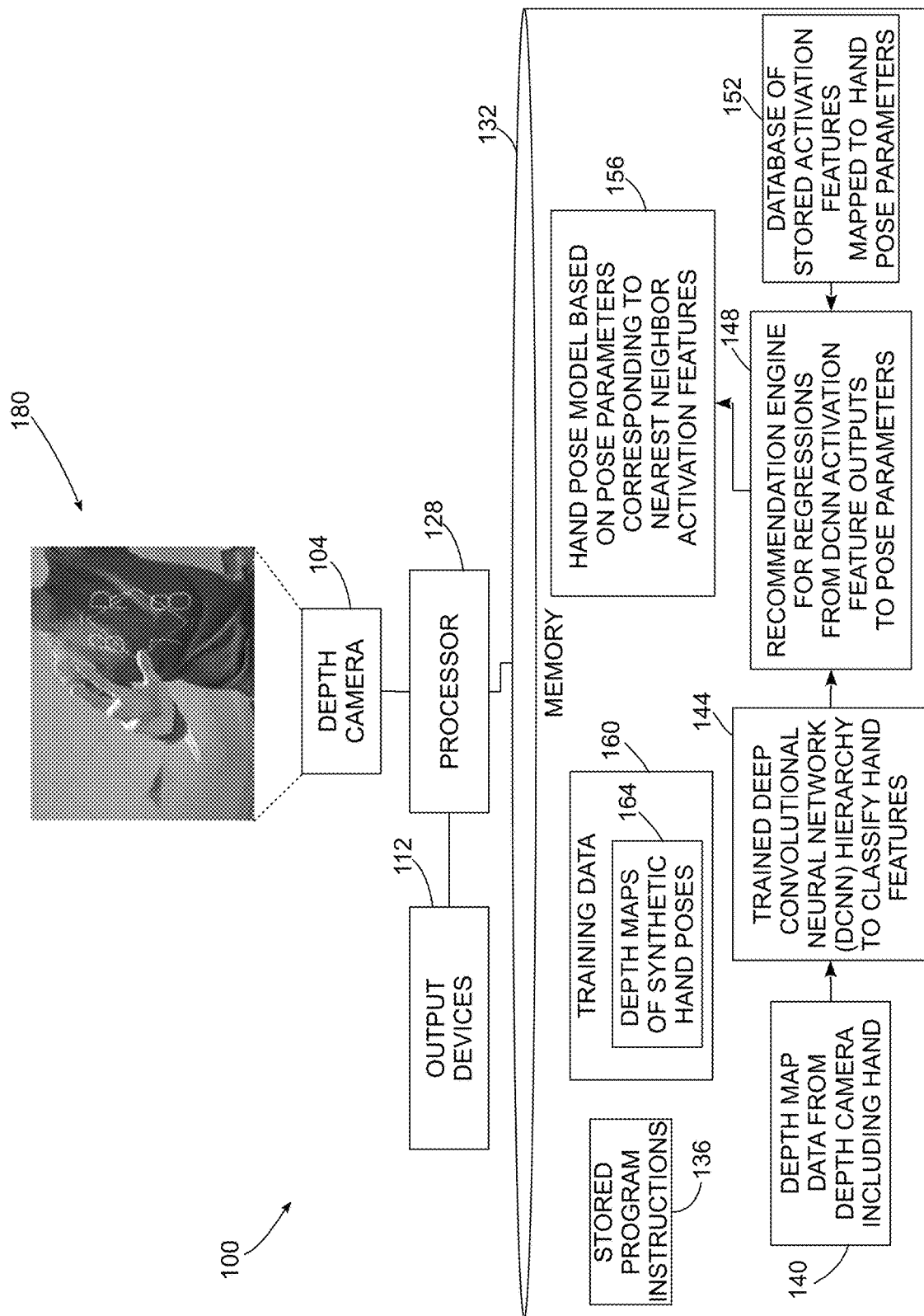
FIG. 1 is a schematic diagram of a system that performs processes for hand pose detection and training of neural networks and a recommendation engine for detection of hand poses.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the terms "digit" and "finger" are used interchangeably and refer to one or more of the five fingers of the human hand (including the thumb). In the human skeleton, the digits are formed from the phalanges bones that are jointed to enable individual fingers to move and curl. The term "wrist" refers to the joint at the base of the hand formed form the carpal bones that connects the hand to the forearm and to the metacarpal bones that form the palm and that connect to the phalanges of the digits. The wrist is also jointed to enable rotation of the entire hand. As used herein, the term "pose" refers to the orientation and shape of the human hand including, for example, the rotational orientation of the hand based on the movements of the wrist and the orientations and shapes of the fingers relative to the wrist based on the movements of the individual fingers.

As used herein, the term "depth map" refers to a set of three-dimensional image data that includes information about the structure of an object, in particular a hand. In one common embodiment of a depth map, the data are encoded as a two-dimensional array of pixels with width ("x-axis") and height ("y-axis") information in a two-dimensional array of pixels and where each pixel value includes a depth value ("z-axis"). The arrangement of the pixels and the depth value data encoded in each pixel form a machine-readable representation of physical objects, including a human hand in different poses.

As used herein, the terms "deep neural network," "deep convolutional neural network", or more simply "neural network" are used interchangeably to refer to machine learning structures that receive input data from a depth map that includes data corresponding to a hand. Neural networks are generally known to the art and include one or more layers of "neurons" that each receive input information and produce an output as, for example, a weighted sum of the inputs with an optional internal bias value within the neuron, or some other predetermined function that produces an output numeric value based on a combination of the input values to the neuron. The weights that are assigned to different inputs in the structure of the neural network are produced during a training process for the neural network. A simple neural network includes an input layer of neurons connected to an output layer of neurons. The output layer of neurons is configured to produce outputs, which are also referred to as an "activation features" herein, based on numeric functions applied to the inputs received at the output layer such as threshold or sigmoid functions with exact parameters that are produced during a training process. A neural network is described as a "deep" neural network because multiple layers of "hidden" neurons are arranged between the input layer and the output layer with varying structures for the hidden layers including "fully connected" layers where the output of a neuron in a first layer is connected to an input of each neuron in the next layer or "partially connected" layers where the outputs of neurons in a first layer are only connected to inputs of a portion of the neurons in the next layer. A neural networks is described as being "convolutional" because the neural networks are formed with a structure and are trained with training data that are translated or "convolved" across the inputs to the neural network to ensure that the neural network can generate outputs to classify particular input features no matter where the features happen to be located in a set of input data, such as a two-dimensional depth map.

While neural networks are generally known to the art, the structure and operation of neural networks taught in this application is substantially different from prior art techniques for multiple reasons, with one reason in particular being that prior art systems rely upon some form of neural network to directly identify a hand pose from input data while the systems and methods of this application do not use neural networks for direct identification of the hand pose. For explanatory purposes, further references to neural networks in the detailed description refer to deep convolutional neural networks although deep convolutional neural networks are not a strict requirement to implement the systems and methods that are described herein.

As used herein, the term "recommendation engine" refers to a software implemented service that receives a set of input metadata and searches for previously observed sets of similar metadata, which are also referred to as "nearest neighbors" in a multi-dimensional search space, and a corresponding set of output parameters that serve as "recommendations" for a given set of input data. Some recommendation engines that are known to the art perform search processes to identify potential product recommendations for products that a consumer may wish to buy based only on "metadata" about the user (e.g. the age, geographic location, income, etc. of the user) without requiring explicit information about the products that a consumer actually has purchased in the past. Instead, the recommendation system performs a search process using the known metadata of the consumer to identify other consumers in a large population of consumers who share similar "metadata" characteristics to the new consumer. The recommendation engine then identifies popular products with the other consumers who do have a history of buying products to recommend the same products to the new user.

In the systems described herein, the recommendation engine receives "metadata" corresponding to the output activation features of a neural network and performs a search processes that identifies hand pose data corresponding to nearest neighbors of the activation feature data in a predetermined database using both spatial and spatial-temporal searches. In the systems and methods described herein, the input metadata for the recommendation engine are the activation features that are output from each of the neural networks that are trained based on joint angle data (although the specific activation features do not describe exact joint angles). The activation feature data are "metadata" pertaining to the pose of the hand because while the metadata are relevant to the pose of the hand, the metadata do not include sufficient information to generate a complete model of a hand in a particular pose. The recommendation engine uses the activation feature data from the neural networks to search a database that includes predetermined sets of observed activation feature data that are associated with sets of "pose parameters" for different hand poses. As used herein, the terms "hand pose parameter" or more simply "pose parameter" are used interchangeably and refer to any data that describe a portion of the pose of a hand, such as the relative location and angle of a given joint in the hand, the locations of finger tips, the orientation and shape of the palm, or any other description of the shape and orientation of the hand that forms the pose. An automated system generates a model of a hand in a given pose based upon pose parameters to identify the pose of the hand as part of a process for receiving input from a user.

FIG. 1 depicts an automated system for computer human interaction 100 that implements at least one of a process that performs hand pose identification based on one or more frames of depth map data that include three-dimensional data corresponding to a hand, and a process to train a neural network and recommendation engine to perform the hand pose identification process. The automated system 100 includes a depth camera 104, one or more output devices 112, a memory 132, and a processor 128 operatively connected to the depth camera 104, the output devices 112, and the memory 132.

In the system 100, the depth camera 104 includes at least one imaging device that further includes a projector, such as an infrared projector, and a receiver that detects radiation emitted from the projector and reflected from three-dimensional objects in an environment around the camera, such as the hand of a user 180 that is depicted in FIG. 1. The projector emits the infrared signals in a predetermined pattern, such as a grid of dots or another structured light pattern. An image processor within the depth camera 104 or, in some embodiments, the processor 128 in the system 100 identifies the reflections of the projected pattern from the surfaces of various objects to generate a frame of depth map data as a two dimensional image with numeric pixel values that correspond to a distance between the camera and an object that is within view of the camera. In some embodiments, the depth camera 104 generates video depth map data at a predetermined frame rate (e.g. 15, 24, 30, or 60 frames per second). Alternative embodiments of the camera 104 include, for example, stereoscopic camera systems or other depth sensor implementations including, for example, LIDAR or millimeter-wave RADAR systems. For the purposes of this document, a depth camera includes any device that is configured to generate digital depth map data for various objects including a human hand.

In the system 100, the output devices 112 include, for example, display screens, three-dimensional imaging devices such as goggles used in virtual reality and augmented reality applications, haptic feedback devices, and network devices that transmit data based on the pose of the hand of the user 180 to other automated computing systems. In some configurations the output devices 112 provide feedback to the user 180 based on the hand poses and gestures from that the user 180 provides as input.

In the system 100, the processor 128 includes one or more digital processing devices including, for example, a central processing unit (CPU) with one or more processing cores, a graphics processing unit (GPU), digital signal processors (DSPs), field programmable gate arrays (FPGAs), application specific integrated circuits (ASICs) and the like. In some configurations multiple processing devices are combined into a System on a Chip (SoC) configuration while in other configurations the processing devices are discrete components. In some embodiments of the system 100, the processor 128 includes digital processing hardware that is configured to perform acceleration of machine learning processes to generate the trained hierarchical neural networks 144 and the hand pose parameters for the database 152. The processor 128 executes the stored program instruction data 136 in the memory 132 to perform the operations described herein.

In the system 100, the memory 132 is formed from one or more digital data storage devices including, for example, magnetic or solid state drives and random access memory (RAM) devices that store digital data. The memory 132 holds stored program instructions 136, a copy of at least one frame of depth map data 140 from the depth camera 104 that includes the hand, a hierarchy of trained deep convolutional neural networks 144, a recommendation engine 148 that performs nearest neighbor searches to identify hand pose parameters stored in a database 152 based on the activation feature outputs from the neural networks 144, and a hand pose model 156 that is generated based on the hand pose parameters that the system 100 identifies in the depth map data. In configurations of the system 100 that perform training of the neural networks 144 and the recommendation engine 148, the memory 132 also stores training data 160; with the embodiment of FIG. 1 including a plurality of depth maps that correspond to depth maps of synthetically generated hand poses 164.

In the system 100, the hierarchy of neural networks 144 are trained to perform a much different task than the prior art systems. In the system 100, the hierarchy of neural networks 144 instead performs a "classification" process. As used herein, the term "classification" as applied to the use of neural networks refers the operation of the neural networks to generate a set of output "activation features" that are similar to activation features produced during a training process when the hand, and individual fingers on the hand, are in predetermined poses from a priori sets of training data. During classification, the activation features of the neural networks do not directly produce quantitative results that indicate the rotation angles of different joints in the wrist or individual fingers of the hand, which would instead be similar to a regression process. Instead, these activation features refer to observed information in the training data that provide "discriminative" information to enable the system 100 to distinguish between differences in the structure of the hand or fingers in the hand in different joint angle positions for the wrist in one neural network or for joint angles in individual fingers based on rotational angle bins of the wrist angle for the remaining neural networks in the hierarch 144. The training process that generates the neural networks 144 implicitly encodes the joint angle information into the neural networks, so that the neural networks can "discriminate" between different joint angles of the hand, which is to say that the neural networks produce different activation feature outputs for different joint angles for either the wrist or individual joints within different fingers in the depth map data. However, the neural networks do not generate outputs that directly estimate the numeric angles of joints in the hand or a finger.

In the hierarchy of neural networks 144, a single neural network at the highest-level of the hierarchy is trained to classify features in the hand model for different rotational angles of the wrist joint. The lower-level of the neural network hierarchy 144 includes multiple sets of neural networks for the fingers of the hand. Within each set of a plurality of neural networks for one finger, each neural network is trained to classify features for the finger in different joint angle positions while the wrist is within a particular quantized range of rotational angles (e.g. one neural network for the index finger while the wrist is in a predetermined rotational range quantized "bin" of 0° to 30° about the longitudinal axis and another neural network for a different wrist rotational range of 30° to 60°). In isolation, the output of the classification process using the hierarchy of neural networks does not produce the hand pose information that is sufficient to perform a regression process. However, the activation features do include sufficient classification information about the hand for the system 100 to then use the recommendation engine 148 to search for similar "nearest neighbor" activation features that were observed either during a training process or in recently recorded depth map data to identify hand pose parameters for the wrist and the individual fingers in the database 152 that correspond to the activation features from the neural networks. The system 100 then completes the regression process by generating a hand pose model based on the hand pose parameters for the different portions of the hand including the wrist and each of the fingers.

Consequently the system 100 does not require a single, highly complex, neural network to perform an inference process to identify the pose of an entire hand. Instead, the system 100 employs the hierarchical neural networks that each have comparatively simple structures and that each only focus on generating activation feature outputs based on learned joint angle features from the hand, beginning with the wrist and then extending to the identification of joint angles in different digits based on the identified wrist joint angle feature.

Unlike some prior-art systems that merely rely on a neural network to identify the full pose of a hand, the neural networks are only responsible for generating sets of activation features that are trained based on predetermined sets of joint angles for the wrist and fingers during a training process. Identifying a full hand pose based on the input data in the depth map is referred to as a "regression" process that generates a hand pose that is a "best fit" for the input data. Prior art systems rely upon neural networks to perform the regression process, but in many respects the neural networks are not well suited to perform the regression process for several reasons. First, the computational complexity of generating a high resolution hand pose using neural networks is quite high, which requires powerful computational hardware to perform the regression process at acceptable speeds for various applications. Second, in many instances a single frame of depth map data only includes a portion of the expected features for a hand, such as when only some of the fingers are visible or when any part of the hand is occluded from the depth camera 104, which is quite common for a single camera. The neural networks can only produce partial results for the hand pose based on the "best fit" of incomplete information from the depth map, which can reduce the quality of an estimated hand pose. The system 100, however, overcomes these disadvantages by using the hierarchical neural networks 144 to classify various features in the depth map data 140 but using the recommendation engine 148 to perform the regression process by searching for the appropriate nearest neighbor hand pose data in the database 152 to identify the hand poses.

In the system 100, the database 152 includes sets of previously observed activation feature data that are mapped to corresponding hand pose parameters. As described above, the hand pose parameters include the actual specific information about the orientation and shape of a hand that are required to generate a model of a hand that is a best fit for the actual hand represented in the depth map data 140. The database 152 includes a fixed set of activation feature to hand pose parameter mappings that are generated from the training data 160 during the training process that produces the trained neural network hierarch 144. Additionally, in some embodiments of the system 100 that record video depth map data, the database 152 stores a cache of previously observed activation feature data and the corresponding hand pose parameters that were identified in previous depth map frames of the hand over a predetermined time period that may correspond to a predetermined number of previously generated depth map frames (e.g. a time corresponding to 0.05 to 0.5 seconds prior to generation of the depth map 140 or 1 to 30 previously recorded depth map frames in different embodiments). As described in further detail below, the recommendation engine 148 performs spatial-temporal searches in the cached data as part of a process for identifying hand pose parameters for a new depth maps based in part upon the hand pose parameters that were observed in recently recorded depth maps in a configuration that receives the depth maps from the depth camera 104 in a video input stream.

Figure 5:
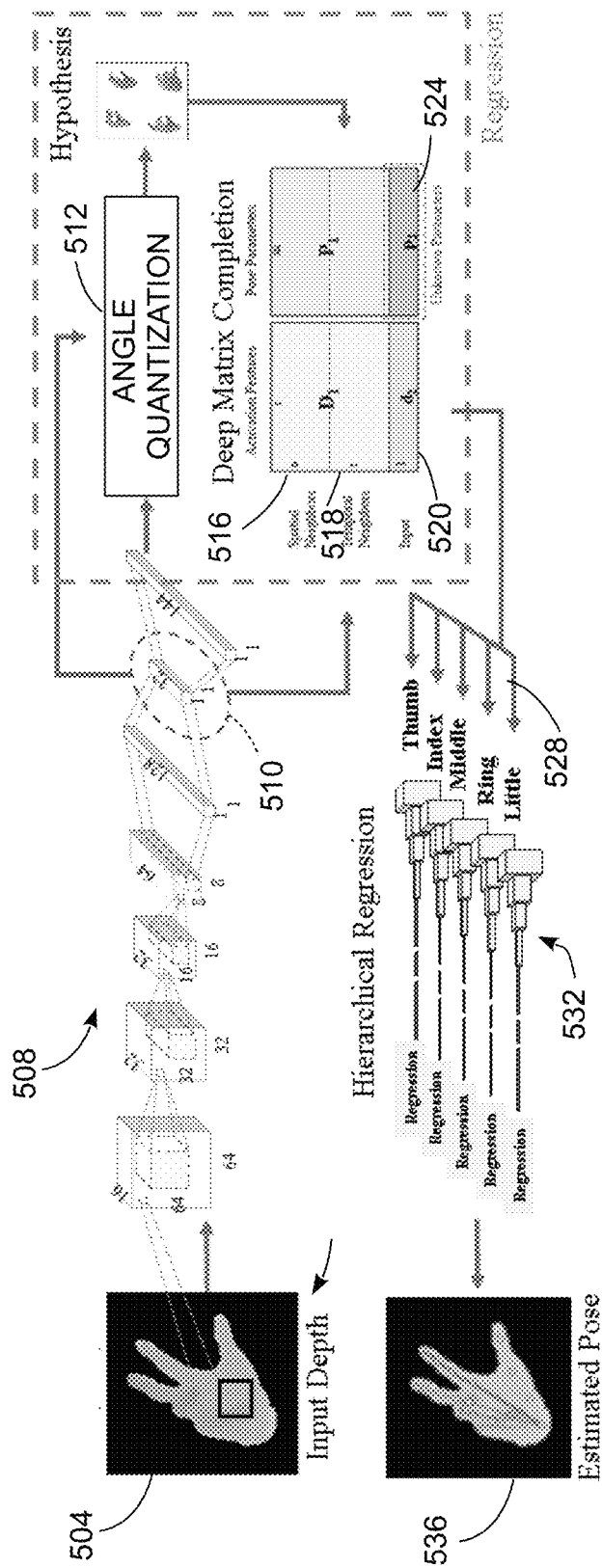
FIG. 5 is a diagram depicting elements in the process of FIG. 2.

In the system 100, the processor 128 uses the activation feature data that are output from the highest level of the hierarchical neural networks 144 corresponding to the wrist to identify rotational angle of the wrist using the recommendation engine 148 to identify a hand pose parameter in the database 152 based on a nearest neighbor search for stored activation feature data that most closely approximate the observed activation features from the neural network 144. The processor 128 then selects a lower-level neural network for each of the five fingers in the hand in the hierarch 144 based on the rotational angle of the wrist where the different ranges of rotation for the wrist are quantized into a predetermined number of bins. Each quantized bin corresponds to a subset of a range of joint angles for the wrist that is associated with a set of five neural networks, one for each finger on the hand, that are trained to classify joint angles for the fingers while the wrist is within the range of joint angles corresponding to the quantized bin. The processor 128 then provides the depth map data 140 to the selected neural networks for each finger (up to five neural networks for five fingers) to generate multiple sets of activation features based on the individual fingers in the hand. The processor 128 then uses the recommendation engine 148 to perform additional searches in the database 152 based on the activation features for each of the five fingers to identify hand pose parameters that correspond to each of the five fingers. As depicted in FIG. 5, the processor 128 uses the recommendation engine 148 to perform multiple regression processes for the activation features of the first neural network to identify the wrist angle hand pose parameters, and the multiple regression processes 532 for the outputs of the selected finger-level neural networks to identify the hand pose parameters for the individual fingers.

Finally, the processor 128 combines the hand pose parameter data for the wrist and each of the fingers to generate the hand pose model 156 based on the pose parameters. The hand pose model 156 is then used, for example, as part of a larger process for tracking motion of the hand, producing a graphical representation of the hand in a given pose in a VR or AR application, or for receiving gesture input in the system 100. During the process 200, the system 100 is able to produce accurate models for the hand even when a part of the hand, such as one or more fingers, is occluded from being directly visible in the depth map data because the system 100 still identifies the hand pose parameters for the portions of the hand that are visible using the hierarchy of neural networks 144 and the recommendation engine 148 to identify hand pose parameters for different portions of the structure of the hand.

Figure 2:
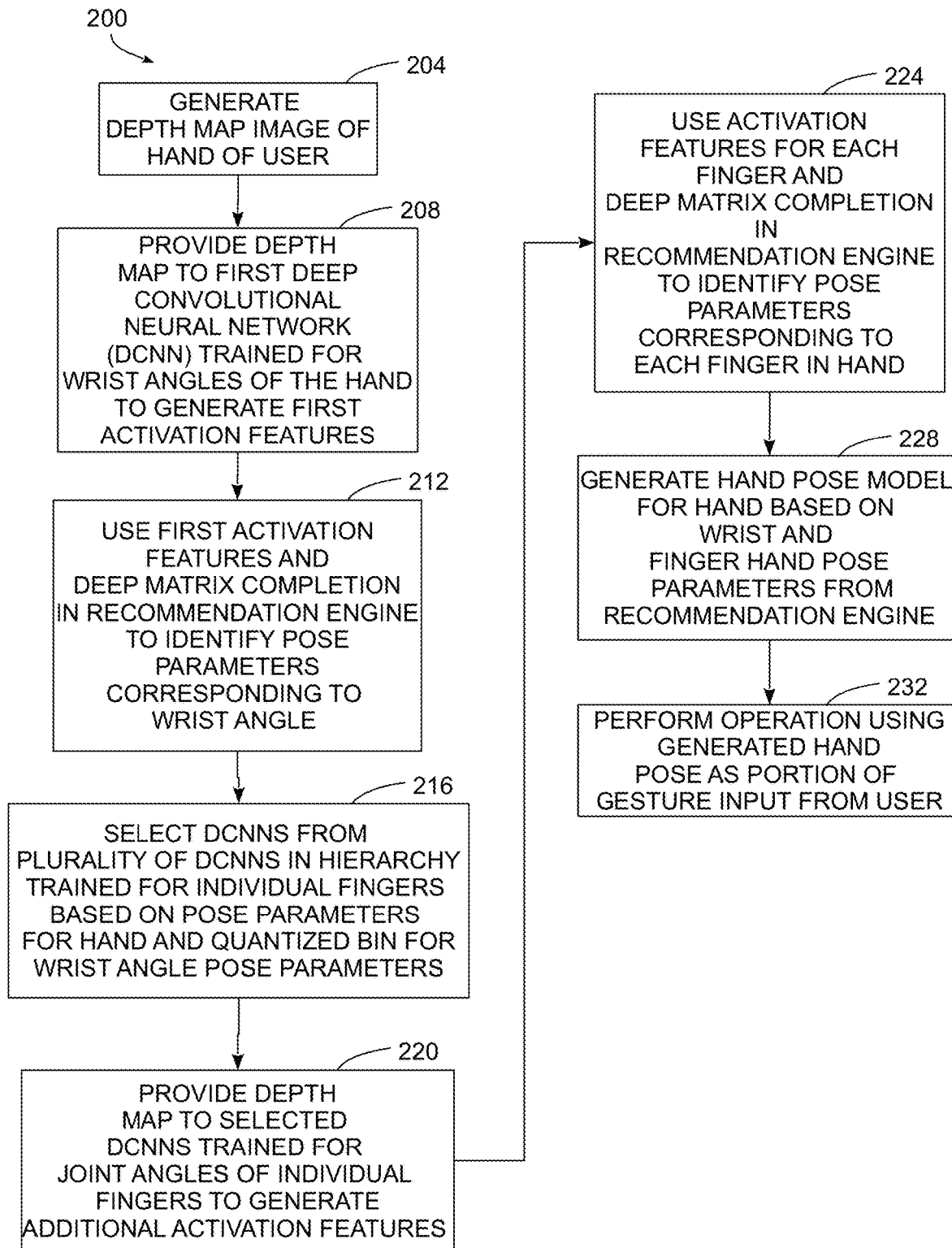
FIG. 2 is a block diagram of a process for performing hand pose detection using a hierarchy of neural networks and a recommendation engine.

FIG. 2 depicts a process 200 for automated identification of the hand pose of a human user as part of an input process to a computerized system. In the description below, a reference to the process 200 performing a function or action refers to the operation of one or more digital processing devices to execute stored program instructions to perform the function or action in conjunction with other components in a computerized system. The process 200 is described in conjunction with the system 100 of FIG. 1 for illustrative purposes.

The process 200 begins as the system 100 generates a depth map image that includes the hand of a user (block 204). In the system 100, the depth camera 104 generates the depth map data 140 that includes the hand of the user 180 and the processor 128 receives the depth map data from the depth camera 104. As depicted in FIG. 5, the depth map 504 includes three-dimensional depth information about the hand. In some embodiments, the user 180 optionally wears a wristband or other marker to assist in isolation the structure of the entire hand to separate the depth map data corresponding to the hand from the remainder of the depth map image data.

The process 200 continues as the processor provides the depth map data to a first deep convolutional neural network that is trained to classify features corresponding to a joint angle of a wrist in the hand to generate a first plurality of activation features (block 208). In the system 100, the processor 128 uses the pixel values of the depth image data 140 as inputs to the input layer of neurons the first neural network and the processor 128 then performs an inference process that is known to the art to generate the activation features as outputs from the first neural network based on the depth map data. In the automated system 100, the processor 128 provides the depth map data of the hand of the user 180 to the first neural network in the neural network hierarch 144 that corresponds to the joint angle of the wrist of the hand to generate a first plurality of activation features corresponding to a joint angle of a wrist in the hand in the depth map data. As described above, the first neural network produces the activation features that correspond to the rotational angle of the entire hand around the wrist, although these activation features do not produce a direct quantitative value for the angle of rotation in the wrist. In the example of FIG. 5, the depth map data 504 are provided to the deep convolutional neural network 508 that, in one embodiment, includes the illustrative structure shown in FIG. 5. In the illustrative embodiment of FIG. 5, the penultimate layer 510 of the neural network 508 generates a plurality of thirty-two (32) activation feature values in a one-dimensional array.

The process 200 continue as the processor 128 uses the first plurality of activation features and the recommendation engine 148 to identify pose parameter data stored in the database 152 that correspond to the angle of the wrist using deep matrix completion process (block 212). The processor 128 uses recommendation engine 148 to perform a search for the nearest neighbors to the first plurality of activation features for the first neural network to identify corresponding hand pose parameters in the database 152 that are mapped to the nearest neighbors of the first plurality of activation features. As depicted in FIG. 5, the recommendation engine 148 searches through a set of spatial neighbors 516 that are stored in the database 152 during a training process for the hierarchy of neural networks 144. The recommendation engine 148 also optionally performs a spatial-temporal search for nearest neighbors to the first plurality of activation features in one or more database entries 518 that correspond to the activation features and hand pose parameters that have been previously observed in other depth map images that were generated within a predetermined time period of the depth map 504. The recommendation engine 148 generates the hand pose parameters 524 that include angle information about the angle of the wrist. In one embodiment of the system 100, the pose parameter data for the angle of the wrist further includes angle information about the orientation of the wrist in six degrees of freedom (DOF) including two DOFs about the longitudinal rotation that extends along the forearm, two DOFs for the up-down angles for a raised or lowered palm, and two DOFs for a left-right rotational angle of the hand.

As described above, the system 100 performs a deep matrix completion (DMC) process to identify hand pose parameters for the wrist or one of the fingers based on the activation feature data produced by the neural networks in the neural network hierarch 144. The DMC process employ collaborative filtering identify the hand pose parameters for nearest neighbors of the neural network output in a single operation without requiring iteration. Let $D_1$ be the matrix of nearest neighbor activation features, and $P_1$ be the corresponding known joint angle parameters for a hand pose. In addition, let vector $d_2$ be the activation feature output from ConvNet of the input depth image being estimated. Let vector $p_2$ be the unknown parameter values. Our task is to estimate $p_2$ given the other 3 block matrices. This is visually elucidated in FIG. 12. Assuming a low rank structure of matrix M, the vector $p_2$ is determined using the following equation:

$$p_2 = d_2(D_1)^{-1}P_1$$

One configuration of the system 100 for hand poses using hand-engineered features includes a kernelizing feature matrix that is regularized by addition of a small constant to the diagonal, in a similar manner to a ridge regression that improves the accuracy of the output. Consequently, the system 100 uses a radial basis function (RBF) kernel with sigma equal to the variance of the dataset. The kernelized matrix is made invertible by addition to a diagonal matrix. Consequently, the kernelized version can be solved directly without resorting to an intermediary SVD which is computationally expensive. This diagonal matrix acts as a regularizer and prevent overfitting similar in spirit to kernel ridge regression.

In the system 100, the performance of the nearest neighbor search process using the recommendation engine 148 may be computationally intensive for larger sets of activation feature data from the neural networks. To improve the efficiency of the spatial and spatial-temporal search processes, the processor 128 uses the classification values that are generated by the soft-max functions that are inherent to each neural network, including the first neural network, to select only a subset of the entries in the database 152 as targets for the nearest neighbor search process.

Figure 4:
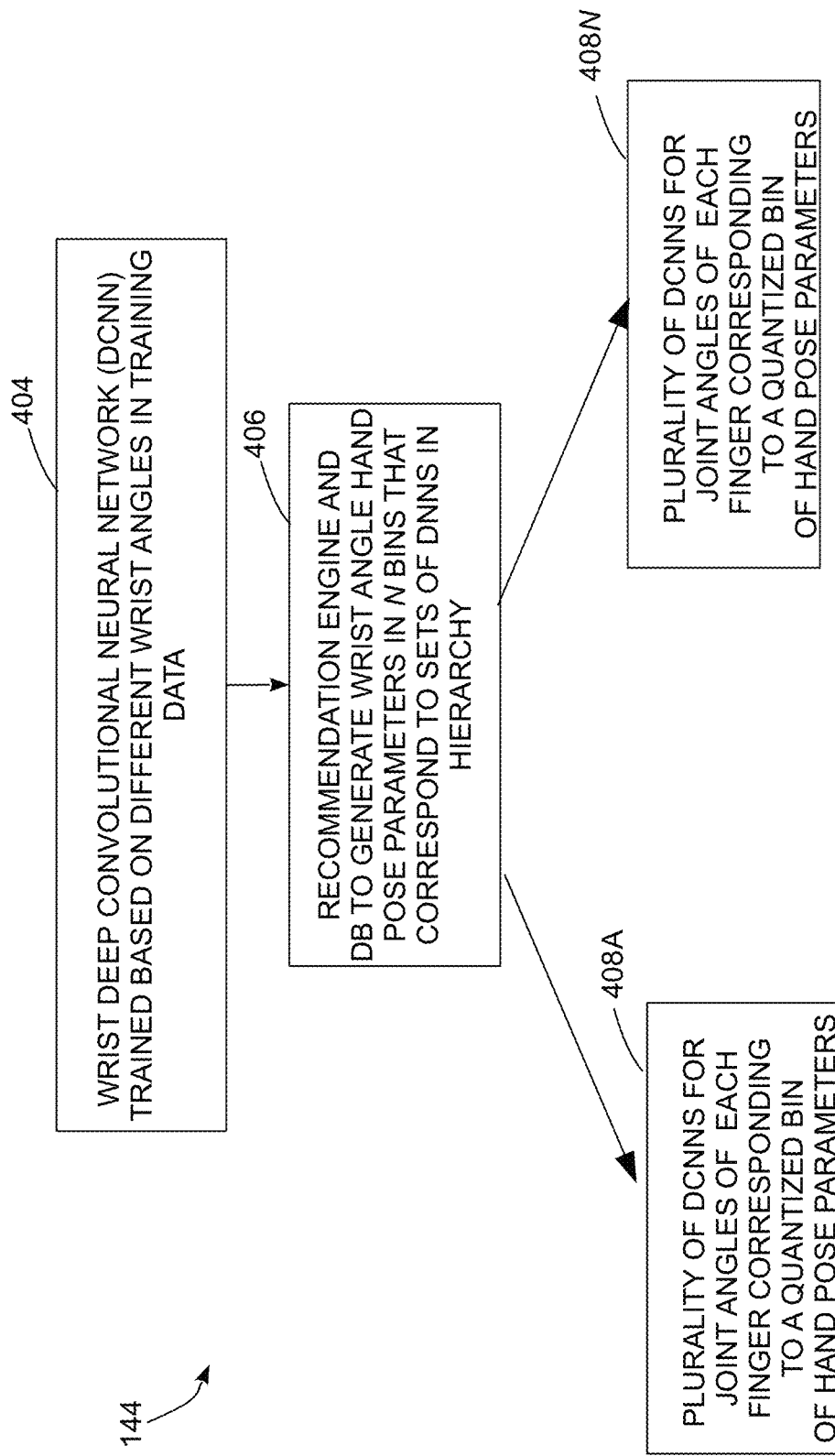
FIG. 4 is a diagram depicting a hierarchical structure of neural networks.

The process 200 continues as the processor 128 identifies a set of neural networks in the hierarchy of neural networks 144 based upon the identified angle of the wrist from the hand pose parameter data and a predetermined set of quantized bins for the identified wrist angle (block 216). In the embodiment of FIG. 5, the processor 128 identifies a quantized bin 512 for the identified angle of the wrist from the previously identified hand pose parameter data. Each bin corresponds to a predetermined numeric range of angles for the wrist in the hand. As depicted in FIG. 4, in the hierarchy of neural networks, the highest-level neural network 404 and the recommendation engine processing 406 generate the angle data for the wrist that is then assigned to one of N discrete quantized bins. Each quantized bin 408A-408N includes a set of up to five neural networks that have each been trained to identify features for one of the fingers on the hand when the overall pose of the hand at the wrist corresponds to the angles for the particular selected bin. For example, the deep convolutional networks 408A include a plurality of neural networks including a second, third, fourth, fifth, and sixth neural network that correspond to the five fingers on the hand when the identified angle of the wrist of the hand is within the bin corresponding to a particular quantized range. Similarly, the neural networks 408N correspond to each of the fingers on the hand when the identified angle of the wrist of the hand is within another quantized bin.

The process 200 continues as the processor 128 provides the depth map data of a hand of the user to each neural network in the plurality of selected neural networks to generate multiple sets of activation features with each of the selected neural networks that are trained to classify features corresponding to joint angles of each of the first, second, third, fourth, and fifth fingers of the hand (block 220). As depicted in FIG. 5, the system 100 provides the depth map data to each of the five selected neural networks corresponding to the fingers in the hand. For each of the selected neural networks that correspond to the different fingers, the processor 128 uses the pixel values of the depth image data 140 as inputs to the input layer of neurons each neural network and the processor 128 then performs an inference process that is known to the art to generate the activation features as outputs from each neural network based on the depth map data. Thus, each neural network in the plurality of selected neural networks generates a plurality of activation features for one finger of the hand based upon the depth map data input.

After generation of the five sets of activation features for each of the fingers using the selected neural networks, the processor 128 once again uses the recommendation engine 148 to perform deep matrix completion to identify hand pose parameters in the database 152 that correspond to each of the fingers using the nearest neighbor search process for the activation features of each finger (block 224). FIG. 5 depicts the regression processes 532 for each set of activation feature data from the neural networks for the individual fingers. In the system 100, the processor 128 uses the recommendation engine 148 to perform the regression process to identify hand pose parameters for the individual fingers using deep matrix completion in a similar manner to the identification of the hand pose parameters for the wrist that are described above.

The process 200 continues as the processor 128 generates a hand pose model corresponding to the hand of the user based on the first plurality of hand pose parameters corresponding to the wrist as well as to each set of hand pose parameters that correspond to the fingers on the hand (block 228). The processor 128 generates the hand pose model using, for example, a predetermined skeletal model of the human hand with the hand pose parameter data being applied to each joint in the skeletal hand model to produce a hand pose model with a pose that that closely approximates the actual pose of the hand of the user 180 that was recorded in the depth map data. In FIG. 5, the estimated hand pose model 536 corresponds to the actual pose of the hand that is present in the depth map data 504.

The process 200 concludes as the processor 128 in the system 100 performs an operation in response to input from the user based at least in part on the hand pose model (block 232). For example, in a motion tracking application the system 100 the processor 128 may generate a visual output with the output device 112 corresponding to the generated hand pose. In a virtual or augmented reality application, the output may include the model of the hand in the pose during interaction with a virtual object. In a gesture input system, the processor 128 uses the hand pose model as part of a process for determining the motion of the hand to identify a gesture input and perform an action based on the gesture input.

While the process 200 uses the hierarchical DNNs and recommendation engines for the wrist and all of the fingers in the hand to identify the hand pose, in alternative embodiments a simplified model may be used for systems that can operate with reduced precision for the hand pose. For example, in a simplified embodiment the system includes a hierarchy of DNNs that only include the wrist and one finger, such as the index finger, or some other subset of the digits. The simplified DNN and recommendation engine configuration reduces the computational complexity of identifying a hand pose in applications that do not necessarily require the highest level of precision for hand pose detection.

Figure 3:
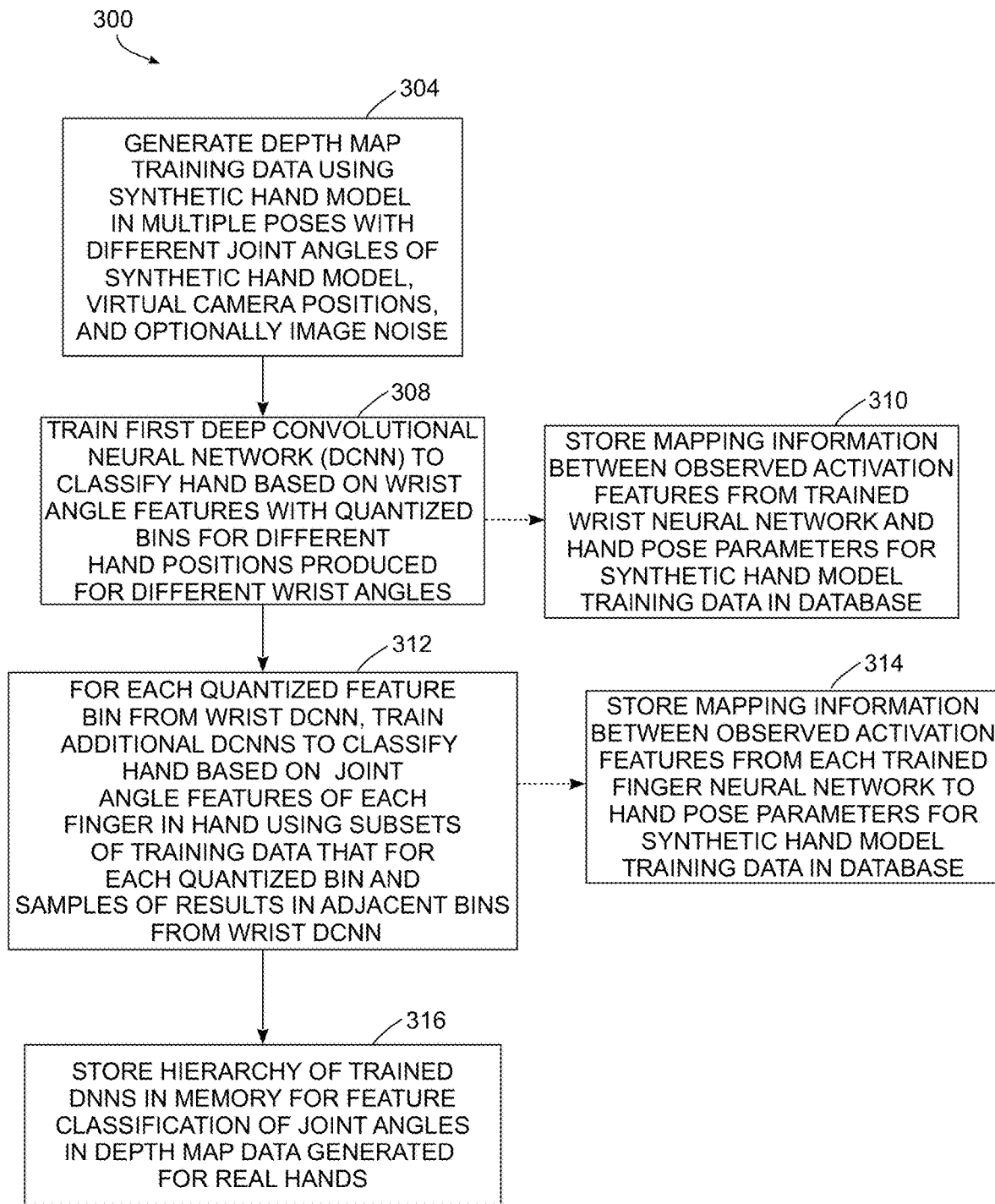
FIG. 3 is a block diagram of a process for training a hierarchy of neural networks and a recommendation engine for hand pose detection.

FIG. 3 depicts a process 300 for generating the trained deep neural network hierarch 144 in the system 100 and for generating mappings between activation features from the trained neural networks with hand pose parameters that are stored in the database 152. In the description below, a reference to the process 300 performing a function or action refers to the operation of one or more digital processing devices to execute stored program instructions to perform the function or action in conjunction with other components in a computerized system. The process 300 is described in conjunction with the system 100 of FIG. 1 for illustrative purposes.

Figure 6:
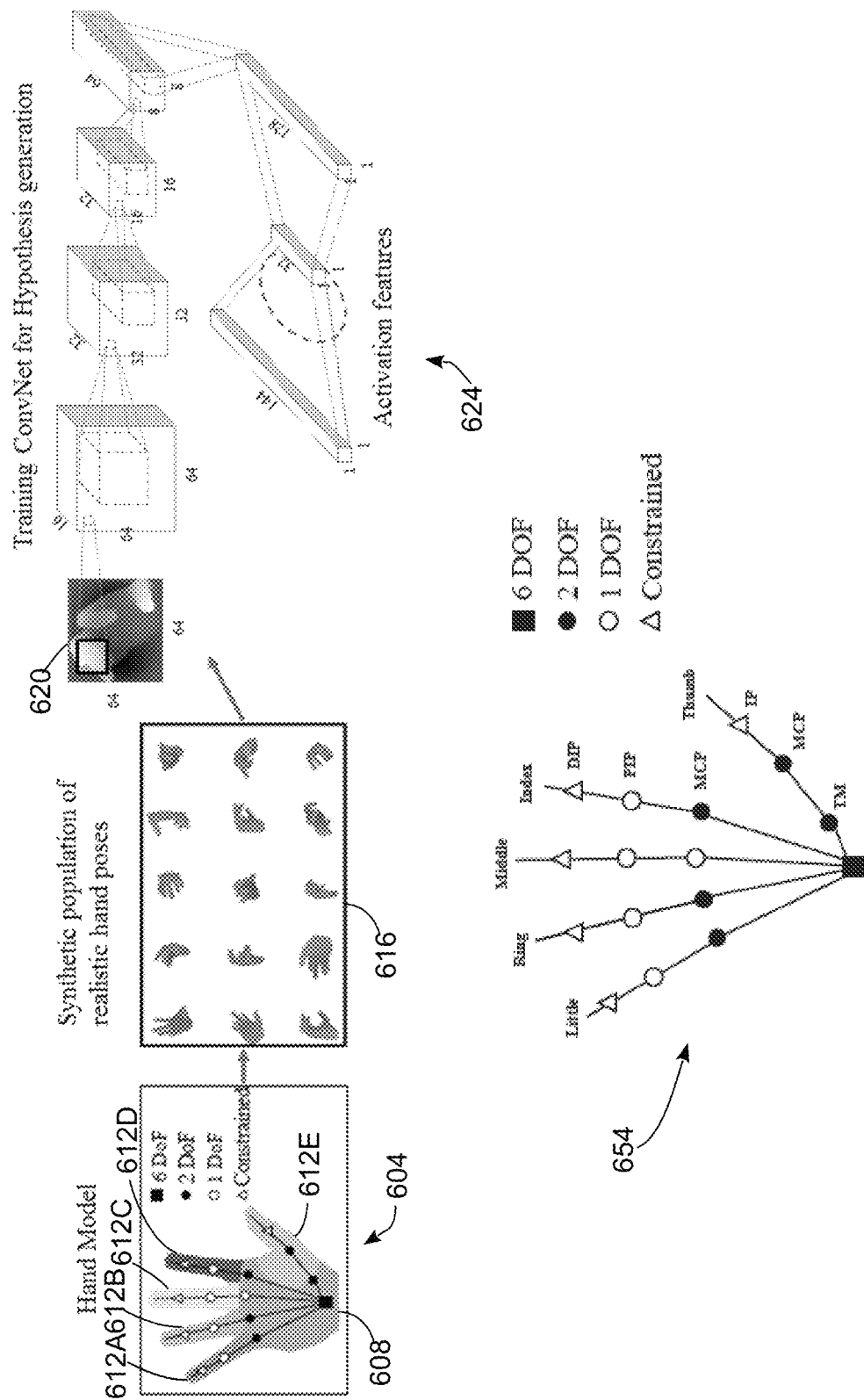
FIG. 6 is a diagram depicting a synthetic hand model and hand poses that are used in the training process of FIG. 3.

The process 300 begins with optional generation of synthetic training data including a plurality of frames of training depth map data that correspond to a synthetically generated hand in a wide range of predetermined poses (block 304). In the system 100, the processor 128 uses a synthetic three-dimensional model of a hand in conjunction with three-dimensional modeling software and a virtual depth camera that views the hand in various poses from various view angles to produce a large set of training data depth map that each correspond to one pose of the hand with known hand pose parameters. FIG. 6 includes an illustration of a synthetic hand model 604 with different groups of joints for the wrist 608 and each of the five fingers 612A-612E of a human hand. In the system 100, the hand model data for the synthetic hand model and other associated constraint data for the synthetic hand model are stored in the memory 132 with the training data 160.

In the system 100, the processor 128 manipulates the synthetic hand model to form a wide range of anatomically realistic poses for the hand. In one embodiment, the system 100 uses a set of anatomic constraints for a hand with a wrist and fingers that have a total of twenty-one degrees of freedom (DOFs) to define the kinematics (i.e. the motions that produce different hand poses) that the artificial hand can perform in a manner that directly corresponds to the range of movements and poses that are expected for an ordinary human hand. In FIG. 6, the illustration 654 depicts a more detailed view of the degrees of freedom for different joints in the synthetic hand model 604. The acronyms DIP, PIP, MCP, IP and TM represent distal interphalangeal joint, proximal interphalangeal joint, metacarpophalangeal joint, interphalangeal joint and trapeziometacarpal joint type, respectively. The joints with two degrees of freedom are a consequence of flexion and abduction motion.

The system 100 uses two types of constraints to model realistic motions and poses in the hand model based on kinematic models that are otherwise known to the art. A first type of constraints set static ranges for tangible joint angle movement guided by the physical anatomy of the human hand. A second type of constraint is a dynamic constraint that depends the first type of constraint. The second type of constraint is further subdivided into intra- and inter-finger constraints, representing the interdependence between joint angles in each finger and adjacent fingers, respectively. The inter-finger constraints limit the flexion of MCP joints in the little, ring, middle, and index fingers. For example, MCP-Flexion of the middle finger is dependent on MCP-Flexion of the index finger.

The system 100 generates the depth maps of different synthetic hand pose by first imposing the first type of static constraints (e.g., range of motion, joint length, location) and the second type of dynamic constraints (e.g., among joints and fingers) upon the hand model 604. The processor 128 then uniformly samples each of the 18 joint parameters in the restricted configuration space. This ensures that the depth maps are reflective of real poses covering a wide range of hand articulations. FIG. 6 depicts a small set of synthetic hand poses 616 for the hand model 604 for illustrative purposes. The processor 128 uses a virtual depth camera to produce depth map data for each pose from at least one camera angle, such as the depth map image 620 depicted in FIG. 6. The depth map 620, and a plurality of other depth maps, are provided as inputs as part of a training process to train the neural networks 144. FIG. 6 depicts a sample neural network 624 that receives the depth map 620 during a training process.

In the system 100, a virtual depth camera that views each pose of the synthetic hand model from various camera angles produces the depth map data for the synthetic hand model in a similar manner to how a real depth camera produces a depth map image for a real hand. One difference between the virtual camera and the real camera is that the depth map produced from the virtual camera is, by default, effectively a perfectly accurate depth map for the synthetic hand model, while real depth cameras do note generate perfect depth map images. In the system 100, the processor 128 modifies at least some frames of the depth map data for the synthetic hand model to introduce noise artifacts similar to those that occur in the depth maps produced by real depth cameras, such as the depth camera 104 in the system 100. The noise reduces the accuracy of the synthetically generated depth map data, which is effectively perfectly accurate, but the noise also makes the synthetic depth map data a more realistic analog to the depth maps that are produced by actual three-dimensional depth cameras, which include sensors that introduce noise, distortion and additional artifacts to depth maps. In the system 100, the processor 128 adds a Gaussian noise signal with distribution $N(0, \sigma^2)$ to the synthetic depth maps wherein the standard deviation is chosen from a range of [0, 2] by uniform sampling.

The large range of different hand poses and virtual camera angles coupled with synthetic noise for the training depth maps enables the system 100 to produce a large number of training depth maps in an efficient manner. In one configuration, the system 100 generates a set of training data with over 200,000 training depth maps automatically without requiring human users to provide input hand poses. Additionally, as described in further detail below, the automated process for generating the training data greatly simplifies the quantization of the different joint angles in the wrist of the hand that the system 100 uses to produce subsets of training data to train the individual neural networks for each finger for each range of wrist positions because the processor 128 has full control over the angular orientation of the wrist in the virtual model of the hand. Furthermore, the automated training process is more precise than using inputs from humans, especially for a very large set of poses where human input is often less accurate as a human user becomes tired or distracted when producing a large number of hand poses. The large coverage ensures that, after training, the neural network hierarchy 144 includes neural networks that can classify discriminative features for the hand in over a wide range of camera viewpoints and are not merely restricted to near frontal poses. The processor 128 stores the training depth map data of the synthetic hand poses 164, such as the depth map image 620 in FIG. 6, and the corresponding hand pose parameters for the three-dimensional model that produced each depth map in the training data 160.

The generation of synthetic training data in the process 300 improves the efficiency and level of control in producing precise sets of training data for the system 100, but the system 100 is also configurable to perform the process 300 without performing the synthetic training data generation process. In another embodiment of the process 300, the training data 160 includes depth images that are generated for actual human hands with predetermined poses and camera angles.

Referring again to FIG. 3, the process 300 continues as the system 100 trains the first deep convolutional neural network based on the joint angle of the wrist in the hand (block 308). In the system 100, the processor 128 uses the training data 160 to train the first neural network that corresponds to a broader pose of the hand based on the angle of the wrist, using the entire set of depth map images 164 in the training data 160. The first neural network is trained to generate a first plurality of activation features that classify an input depth map data corresponding to a hand based on a wrist angle of the hand, with the training process using the plurality of training depth maps 164 in the memory 132 as inputs to the first neural network during the training process. After the training process is completed, the trained neural network for the wrist produces output activation features that are discriminative for different angles of the wrist in the hand, which is to say that first neural network produces different activation feature outputs that classify different angles of the wrist of the hand based on the training data and for new inputs that are provided to the trained neural network during the process 200 described above. As is also described above, however, the output activation features do not provide a direct quantitative estimate of the exact angle of the wrist in the hand. Instead, the neural network is trained to produce activation features that have different values to classify different features that are produced when the pose of the hand has different wrist angles, which are stored in the training data 160, to classify the different wrist angles. As described above in conjunction with the process 200, the system 100 uses the activation features from the first neural network as inputs to the recommendation engine 148 to perform the spatial and spatial-temporal searches for nearest neighbors of the activation features that are mapped to the actual hand pose parameters in the database 152. As depicted in FIG. 4, the first neural network 404 is trained to perform classification of the depth map data based on the joint angles for the wrist.

In addition to training the first neural network, the processor 128 populates the database 152 with mappings of the activation features that the first trained neural network produces upon completion of the training process to the known hand pose parameters for the training data 160 (block 310). As described above in the process 200, the system 100 identifies hand pose parameters using a nearest neighbor search and deep matrix completion process to identify stored activation features that are mapped to hand pose parameters that are nearest neighbors to the activation features for newly generated depth map data of a hand. During the training process 300, the system 100 generates the database 152 including the activation features mapped to hand pose parameters for the wrist based on the predetermined training data and the activation feature outputs of the trained neural network.

During the process 300, the processor 128 has complete information about the joint angle features for each depth map in the training data. The processor 128 performs the quantization process to group different subsets of the training data into discrete groups ("bins") based on predetermined subsets of ranges of joint angles for the wrist. The processor 128 trains individual sets of neural networks for the fingers using a subset of the training data that includes the depth maps corresponds to each bin for the rotational angles of the wrist. Each set of neural networks for the fingers corresponds to one of the bins and the processor 128 uses a subset of the depth maps in the training data 160 that correspond to the particular bin to perform the training process (block 312). The processor 128 trains the neural networks for the individual fingers to produce activation feature outputs that classify the different fingers based on the known joint angles of each finger within each set of depth map data in the selected training data. As with the first trained neural network, the activation feature outputs of the trained neural networks for each finger do not directly identify individual joint angles in the fingers, but instead produce different sets of output activation features that enable the system 100 to distinguish between different joint angles for each of the fingers during the process 200, and to use the activation feature outputs as inputs to the recommendation engine 148 to identify the pose parameters for each finger. As depicted in FIG. 4, the system 100 trains sets of neural networks based on the joint angles for each finger to form a plurality of trained neural networks 408A to 408N for the fingers in each of the N quantized bins.

In some embodiments, the system 100 also randomly selects a portion of the depth maps in the training data 160 for bins that are adjacent to the subset of the training data that are being used to train a particular set of neural networks, which improves the robustness of the neural networks in classifying the fingers in situations when the angle of the wrist is near the boundary between two bins. For example, to train the neural networks for each of the fingers corresponding to a rotational angle range of 30° to 45° for one or more of the degrees of freedom for the wrist, the processor 128 uses the subset of depth maps in the training data 160 that correspond to the quantized bin for the rotational angle range and randomly selects a portion of the depth map data 164 for the adjacent quantized bins in the 15° to 30° range and 45° to 60° range. The same quantized bins that are used in the process 300 to train sets of the neural networks for each finger within each rotational range bin for the wrist are used to select the neural networks in the hierarchy of neural networks 144 for the individual fingers on the hand in the process 200.

In addition to training the neural networks for the individual fingers for each of the quantized bins, the processor 128 populates the database 152 with mappings of the activation features that the hierarchy of neural networks produce upon completion of the training process to the known finger pose parameters for the training data 160 (block 314). During the training process 300, the system 100 generates additional entries in the database 152 including the activation features mapped to hand pose parameters for the individual fingers based on the predetermined training data and the activation feature outputs of the trained neural network.

The process 300 concludes as the processor 128 stores the trained neural networks in the hierarchical neural network structure 144 in the memory 132 (block 316). As described above in the process 200, the system 100 uses the hierarchy of neural networks to classify additional depth maps of the hand that the depth camera 104 produces during operation of the system 100 based on first neural network that discriminates features based on the wrist angle and the additional neural networks that are selected based on the quantized bin of the wrist angles and that classify the features for joint angles in the individual fingers.

Figure 7:
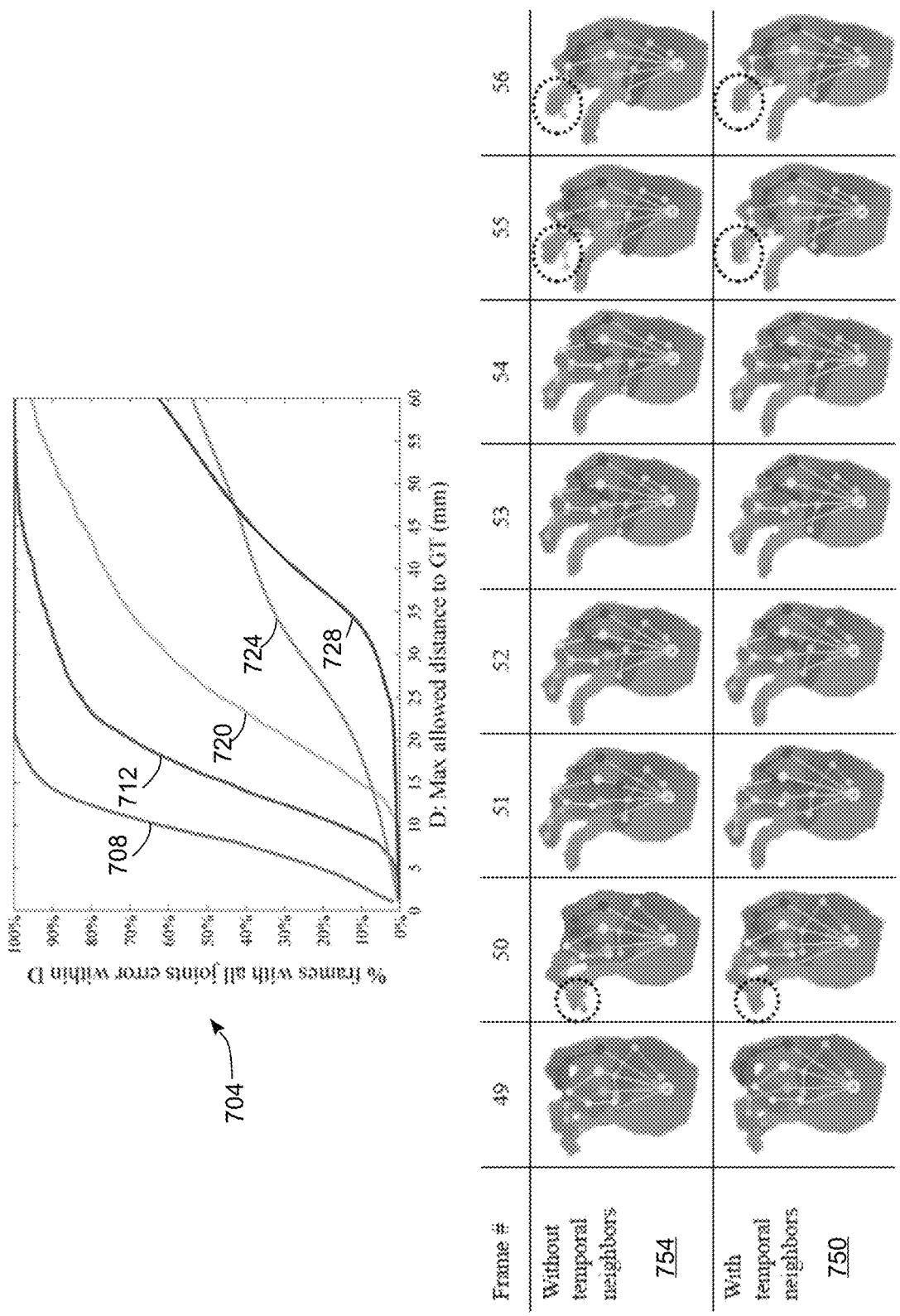
FIG. 7 is a graph depicting results of the hand pose detection process of FIG. 2.

The methods and systems described herein present specific improvements to the operation and structure of computerized systems that perform computer-human interactions. In particular, the methods and systems described herein improve the accuracy and computational efficiency for automated detection of human hand poses that serve as inputs to control the operations of computing systems. FIG. 7 depicts a graph 704 that shows the accuracy of two different configurations 708 and 712 of the hand pose detection processes and systems described herein compared to three prior art techniques (plots 720, 724, and 728). In FIG. 7, the graph 704 depicts the percentage of frames of depth map data (y-axis) for which each hand pose identification system accurately estimates the relative positions of all the joints in a hand to within a predetermined number of millimeters (x-axis). The plot 708 corresponds to an embodiment of the process 200 that uses both spatial searches and spatial-temporal searches in the database 152 to identify hand pose parameter. The plot 712 corresponds to another embodiment of the process 200 that uses only the spatial search process. Both of these embodiments show clear improvements over the prior art. The diagram 750 depicts examples of individual sets of generated hand model data compared to the input depth map for a hand that are generated for frames of depth map data in an embodiment of the process 200 that performs the spatial and spatial-temporal searches. The diagram 754 depicts the same results using the embodiment of the process 200 that performs only spatial searches.

While the systems and methods described herein are directed to pose detection for a human hand, the same systems and methods can be applied to the detection of poses in other contexts including other human extremities, the movements of animals or robots, and to poses formed with the human head and face. It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A system for computer human interaction comprising:
a depth camera configured to generate depth map data of a hand of a user;
an output device;
a memory storing at least a first neural network; and
a processor operatively connected to the depth camera, the output device, and the memory, the processor being configured to:
receive depth map data of the hand of the user from the depth camera;
generate, using the first neural network, a first plurality of activation features base at least in part on the depth map data;
perform a first search in a predetermined plurality of activation features stored in a database of the memory to identify a first plurality of hand pose parameters for the wrist using nearest neighbor identification;
generate a hand pose model corresponding to the hand of the user based on the first plurality of hand pose parameters; and
generate an output with the output device in response to input from the user based at least in part on the hand pose model.

2. The system of claim 1, wherein the processor is further configured to:
identify a second neural network stored in the memory based upon the first plurality of hand pose parameters, the second neural network being one neural network in a plurality of neural networks stored in the memory trained to classify features corresponding to joint angles of a first finger of the hand; and
generate a second plurality of activation features using the depth map data of the hand of the user and the second neural network.

3. The system of claim 2, wherein the memory further stores a recommendation engine, and wherein the processor is further configured to:
perform a second search, using the recommendation engine, in the predetermined plurality of activation features stored in the database to identify a second plurality of hand pose parameters for the first finger using nearest neighbor identification; and
generate the hand pose model corresponding to the hand of the user based on the first plurality of hand pose parameters and the second plurality of hand pose parameters.

4. The system of claim 3, wherein the processor is further configured to:
identify a plurality of neural networks stored in the memory based upon the first plurality of hand pose parameters, each neural network in the plurality of neural networks being trained to classify features corresponding to joint angles of one of a second finger, a third finger, a fourth finger, and a fifth finger of the hand;
provide the depth map data of the hand of the user to each neural network in the plurality of neural networks to generate a plurality of activation features for each of the plurality of neural networks, each plurality of activation features corresponding to joint angles of one of the second, third, fourth, and fifth fingers in the depth map data.

5. The system of claim 4, wherein the processor is further configured to:
perform a plurality of searches in the predetermined plurality of activation features stored in the database based on the plurality of activation features for each of the second, the third, the fourth, and the fifth fingers to identify additional pluralities of hand pose parameters for the second, the third, the fourth, and the fifth fingers; and generate the hand pose model corresponding to the hand of the user based on the first plurality of hand pose parameters, the second plurality of hand pose parameters, and the additional pluralities of hand pose parameters for the second, the third, the fourth, and the fifth fingers.

6. The system of claim 5, wherein the processor is further configured to:

perform each of the plurality of searches as a spatial search of the predetermined plurality of activation features.

7. The system of claim 5, wherein the processor is further configured to:

perform each of the plurality of searches as a spatial-temporal search of another plurality of activation features.

8. The system of claim 2, wherein the processor is further configured to:

perform a second search in the predetermined plurality of activation features stored in the database to identify a second plurality of hand pose parameters for the first finger using nearest neighbor identification; and generate the hand pose model corresponding to the hand of the user based on the first plurality of hand pose parameters and the second plurality of hand pose parameters.

9. The system of claim 8, wherein the processor is further configured to:

identify a predetermined subset of a range of joint angles for the wrist that includes the joint angle of the wrist in the first plurality of hand pose parameters; and identify the second neural network based on a predetermined relationship between the predetermined subset of the range and the plurality of neural networks stored in the memory.

10. The system of claim 2, wherein the processor is further configured to:

identify a predetermined subset of a range of joint angles for the wrist that includes the joint angle of the wrist in the first plurality of hand pose parameters; and identify the second neural network based on a predetermined relationship between the predetermined subset of the range and the plurality of neural networks stored in the memory.

11. The system of claim 1, wherein the processor is further configured to:

perform the first search as a spatial search of the predetermined plurality of activation features in the database to identify the first plurality of hand pose parameters.

12. The system of claim 1, wherein the processor is further configured to:

perform the first search as a spatial-temporal search of another plurality of activation features and associated hand pose parameters in the database corresponding to at least one previous depth map generated by the depth camera within a predetermined time period of generation of the depth map data to identify the first plurality of hand pose parameters.

* * * * *